Figure 1:
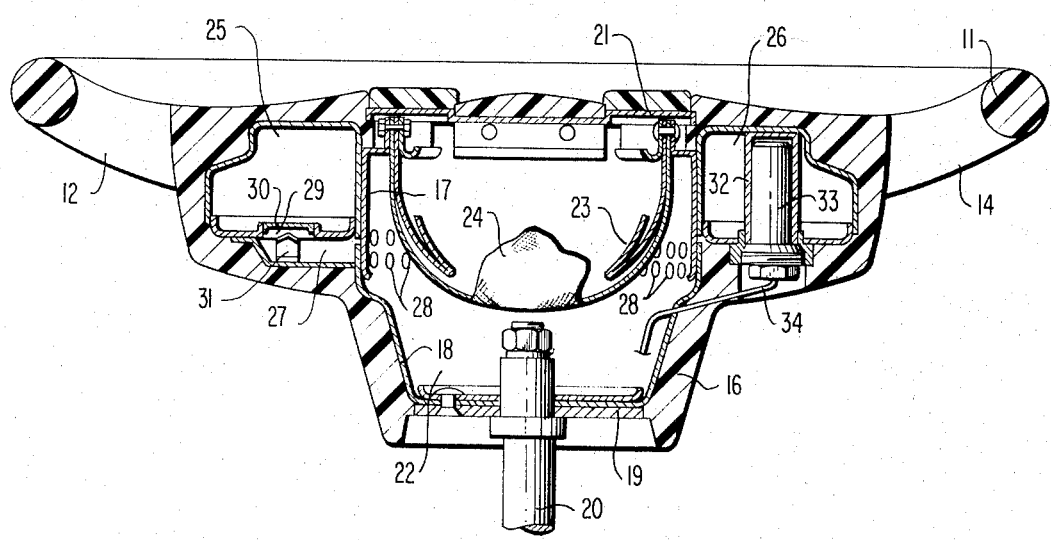

United States Patent [19]
Schiesterl

[11] 3,774,932
[45] Nov. 27, 1973

[54] SAFETY STEERING

[75] Inventor: Gerhard Schiesterl, Stuttgart, Germany

[73] Assignee: Daimler-Benz Aktiengesellschaft, Stuttgart-Unterturkheim, Germany

[22] Filed: Nov. 23, 1971

[21] Appl. No.: 201,408

[30] Foreign Application Priority Data
Nov. 27, 1970 Germany............... P 20 58 411.6

[52] U.S. Cl............ 280/87 R, 74/492, 137/68, 141/329, 222/5, 280/150 AB
[51] Int. Cl............................................. B60r 21/06
[58] Field of Search ........ 280/87 R, 87 A, 150 AB; 180/78; 222/5; 141/329, 330; 137/68; 74/492

[56] References Cited
UNITED STATES PATENTS

| | | | |
|---|---|---|---|
| 3,674,284 | 7/1972 | Lohr........................... | 280/150 AB |
| 3,618,976 | 11/1971 | Leising et al............... | 280/150 AB |
| 3,680,884 | 8/1972 | Stephenson................. | 280/150 AB |
| 3,539,200 | 11/1970 | Chute......................... | 280/150 AB |
| 3,613,944 | 10/1971 | Zeigler et al................ | 222/5 |
| 3,180,373 | 4/1965 | Hebenstreit................. | 222/5 X |
| 3,450,414 | 6/1969 | Kobori........................ | 280/150 AB |
| 3,618,974 | 11/1971 | Chute......................... | 280/150 AB |
| 3,532,360 | 10/1970 | Leising et al............... | 280/150 AB |
| 3,540,304 | 11/1970 | Weiss......................... | 180/78 X |
| 1,766,182 | 6/1930 | Markus....................... | 141/330 X |

*Primary Examiner*—Leo Friaglia
*Assistant Examiner*—Leslie J. Paperner
*Attorney*—Craig, Antonelli & Hill

[57] ABSTRACT

A safety steering for motor vehicles with a deformation member arranged between the steering wheel and the upper end of the steering spindle which together with the hub frame, the hub bottom and the hub cover forms a hollow space in which an inflatable gas cushion is stored; the inflatable gas cushion is automatically inflated when a predetermined deceleration of the vehicle is exceeded, from two containers storing liquified gas which are arranged at substantially mutually oppositely disposed wall portions of the hub frame; a channel leading to the hollow space adjoins each container and a cartridge for the development of evaporating heat projects into each container.

10 Claims, 2 Drawing Figures

SAFETY STEERING

The present invention relates to a safety steering mechanism for motor vehicles with a deformation member arranged between the steering wheel and the upper end of the steering spindle, which together with the hub frame, the hub bottom and the hub cover forms a hollow space in which is accommodated an inflatable gas cushion which upon exceeding a predetermined deceleration of the vehicle, is automatically inflated by a pressure gas producer arranged outside of the hollow space.

Such an arrangement in case of an impact of the vehicle protects the driver against injuries caused by parts of the vehicle steering system by means of the gas cushion and possibly in addition thereto or in case of failure thereof, by an energy-absorbing deformation member of the steering wheel.

Since the common accommodation of the gas producer and of the deformation member in the hub of the steering wheel leads to relatively large dimensions, it has already been proposed heretofore to utilize a pyrotechnic gas producer outside of the hub. The present invention is concerned with the task to provide a practical realization of such a safety steering mechanism which is characterized both by a special space-saving type of construction as well as by reliability. This is realized according to the present invention in that the gas producer consists of two containers for liquified gas arranged at approximately mutually opposite wall parts of the hub frame, which are each adjoined by a channel leading to the hollow space, and into which projects a cartridge of conventional construction for the development of the evaporating heat.

Such a construction results in a very slight structural height and thus reduces the space requirements within the vehicle. It may also be subsequently installed without any structural changes of the steering spindle in lieu of a simple steering wheel equipped only with a deformation member. The subdivision of the gas producer into two elements increases the operating safety since also in case of failure of one element, the gas cushion remains operable to such an extent that injuries can be prevented far-reachingly.

It is particularly advantageous according to the present invention that the steering wheel includes two pairs of spokes, between the spokes of which one container each is arranged. With this construction the two elements of the gas producer are utilized for the reinforcement of the spokes. Therebeyond this type of construction offers an enlargement of the hub surface, desirable for safety reasons, without, however, impairing the handling of the steering wheel or the view on the instrument panel.

Accordingly, it is an object of the present invention to provide a safety steering for motor vehicles which avoids by simple means the aforementioned shortcomings and drawbacks encountered in the prior art.

Another object of the present invention resides in a safety steering device which is characterized by extraordinarily low structural height and small space requirements.

A further object of the present invention resides in a safety steering device of the type described above which can be readily installed into existing safety steering devices without any substantial structural changes.

Still a further object of the present invention resides in a safety steering device which is characterized by greater operational reliability.

Another object of the present invention resides in a safety steering device which offers greater safety and compactness without impairing handling of the steering wheel and/or visibility of the instruments at the instrument panel.

Figure 2:
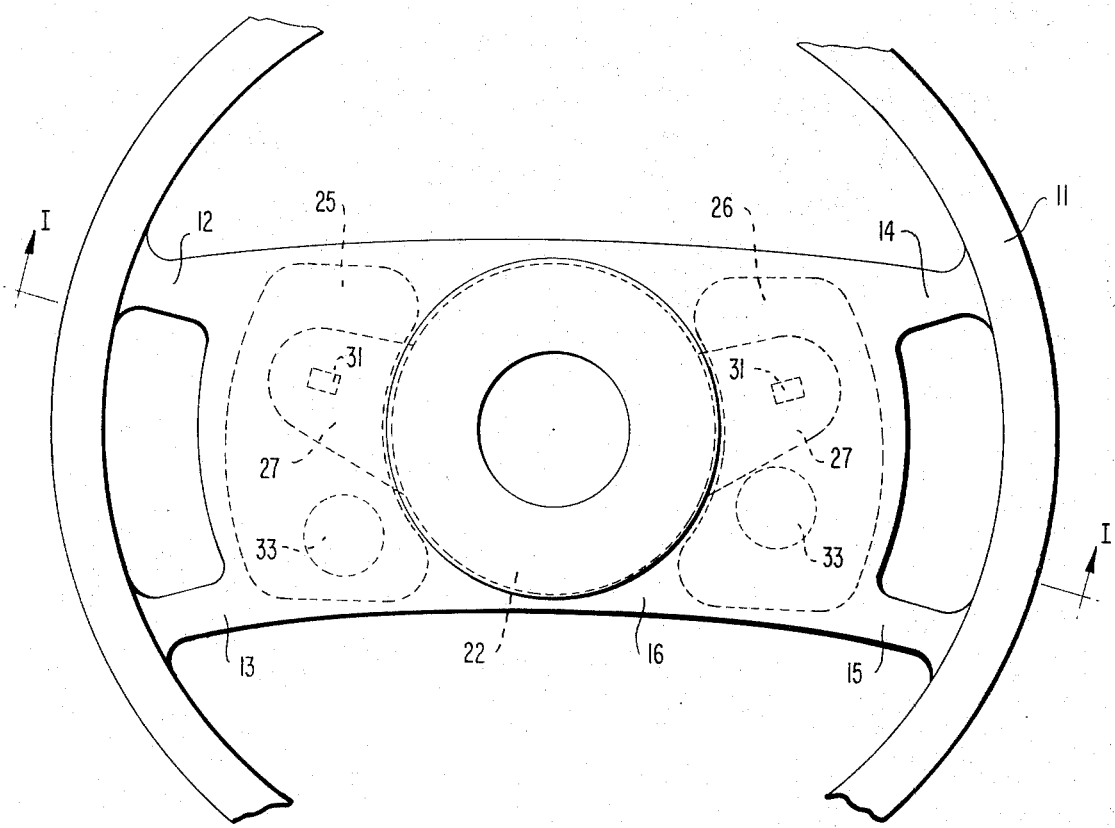

These and further objects, features and advantages of the present invention will become more apparent from the following description when taken in connection with the accompanying drawing which shows, for purposes of illustration only, one embodiment in accordance with the present invention, and wherein:

FIG. 1 is a cross-sectional view through a steering wheel according to the present invention, taken along line I—I of FIG. 2, and FIG. 2 is a top plan view of the steering wheel of FIG. 1.

Referring now to the drawing wherein like reference numerals are used throughout the two views to designate like parts, the rim 11 of the steering wheel is connected with the hub body 16 by four, pair-wise arranged spokes 12 and 13 as well as 14 and 15 (FIG. 2). A ring-shaped hub frame 17 (FIG. 1) arranged within the hub body 16 passes over into a deformation member 18 which has approximately the shape of a truncated cone. The deformation member 18 is connected with a steering spindle 20 by way of a hub bottom 19. The hub frame 17, the deformation member 18 and the hub bottom 19 form together with the hub cover 21 elastically retained in the hub body 16, a hollow space 22 into which the deformation member 18 is forced under plastic deformation in case of a strong impact against the steering wheel and thereby absorbs impact energy.

A gas cushion 23 is stored in the hollow space 22 which is retained in the folded together condition underneath the hub cover 21 by a large-mesh netting cover 24 made from non-metallic fabric. The gas cushion 23 and the netting case 24 are secured in a conventional manner at the upper rim of the hub frame 17.

One container or tank 25 and 26 each is secured at mutually opposite wall parts of the hub frame 17 between the spoke pairs 12/13 and 14/15, respectively; below each tank 25 and 26 is arranged a channel 27, each leading to the hollow space 22. Apertures 28 in the hub frame 17 and in the deformation member 18 establish the communication between the channels 27 and the hollow space 22. In contradistinction thereto, the connections between bottom apertures 29 in the tanks 25 and 26 and the associated channels 27 are closed off by an inserted diaphragm 30. A knife-edge 31 directed toward a respective diaphragm 30 is provided by conventional means in the channels 27 at a small distance from the corresponding diaphragm 30.

One sleeve 32 each projects into the containers 25 and 26 which serve for the storing of liquified gases; a cartridge 33 with a conventional powder charge for the development of evaporating heat is screwed into the respective sleeve or bushing 32. An ignition line 34 leads from a conventional deceleration switch (not shown) possibly under interconnection of sliding contacts, to each cartridge 33.

If during an impact of the vehicle, the deceleration thereof exceeds a predetermined value, then the deceleration switch (not shown) turns on the ignition current for the cartridge 33. Under the influence of the heat developed by the ignited cartridge 33, the liquified gas, for example, $CF_2Cl_2$, contained in the tanks 25 and 26 evaporates instantaneously and deflects the diaphragms 30 toward the outside until they either tear open or are cut open during the further deflection by the knife edges 31. The gases which are under high pressure reach the hollow space 22 through the bottom openings 29, the channels 27 and the openings 28; the gas cushion 23 is thus forced out of the hollow space 22 whereby the hub cover 21 disengages from the hub body 16 and is deflected toward the side. The gas cushion 23 unfolds in front of the steering wheel and is tightly inflated. If the driver of the vehicle is pressed against the gas cushion 23, then energy is dissipated by an accurately dimensioned escape or outflow of gas. Possibly still present energy can be subsequently reduced by the deformation member 18. It is thereby of advantage that the netting jacket 24 of the gas cushion 23 consists of a non-metallic fabric so that, unlike as with the purely pyrotechnic gas producers, wedged-in metallic parts of the wire-mesh fabrics normally utilized in connection therewith might impair the planned progress of the deformation.

While I have shown and described only one embodiment in accordance with the present invention, it is understood the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A safety steering system for motor vehicles including a steering wheel comprising: a hub body means, a hub bottom disposed on the lower end of said body means, a hub cover means disposed on the upper end of said hub body means, said hub body means, hub bottom and hub cover means defining a hollow space, a deformation member disposed in said hollow space, an inflatable gas cushion means disposed in a portion of said hollow space above said deformation member inflatable upon a predetermined deceleration of the vehicle, a gas producing means including two tank means for liquified gas disposed approximately at mutually opposite portions of said hub body means outside of said hollow space, channel means in said hub body means for communicating with said hollow space and cartridge means for development of evaporating heat into each of said tank means whereby said gas cushion means is forced out of said hollow space upon inflation thereof.

2. A safety steering system according to claim 1, wherein only two tank means are used.

3. A safety steering system according to claim 1, including a hollow netting means for retaining said inflatable gas cushion means in said hollow space, said netting means including a netting cover of large-mesh, non-metallic fabric.

4. A safety steering system according to claim 1, including a diaphragm means for closing said tank means with respect to the corresponding channel means leading to said hollow space.

5. A safety steering system according to claim 4, wherein a knife edge means is provided and disposed in the part of the channel means opposite the respective diaphragm means.

6. A safety steering system according to claim 1, wherein the steering wheel includes two pairs of spokes, one tank means each being arranged between a respective pair of spokes.

7. A safety steering system according to claim 6, including a diaphragm means for closing said tank means with respect to the corresponding channel means leading to said hollow space.

8. A safety steering system according to claim 7, wherein a knife edge means is provided and disposed in the part of the channel means opposite the respective diaphragm means.

9. A safety steering system according to claim 8, including a hollow netting means for retaining said inflatable gas cushion means in said hollow space, said netting means including a netting cover of large-mesh, non-metallic fabric.

10. A safety steering system according to claim 9, wherein only two tank means are used.

* * * * *